PRODUCTION OF MAGNETIC SOUND TAPE

Filed Dec. 21, 1950 5 Sheets-Sheet 1

INVENTORS
William C. Speed
James J. Dodge
BY
Rennie, Edmonds, Morton & Barrows
ATTORNEYS

PRODUCTION OF MAGNETIC SOUND TAPE

Filed Dec. 21, 1950

5 Sheets-Sheet 2

INVENTORS
William C. Speed
James J. Dwyer
BY
Pennie, Edmonds, Morton & Barrows
ATTORNEYS July 14, 1953 W. C. SPEED ET AL 2,645,270

PRODUCTION OF MAGNETIC SOUND TAPE

Filed Dec. 21, 1950 5 Sheets-Sheet 3

INVENTORS
William C. Speed
James J. Dwyer
BY
Pennie, Edmonds, Morton & Barrows
ATTORNEYS July 14, 1953 W. C. SPEED ET AL 2,645,270

PRODUCTION OF MAGNETIC SOUND TAPE

Filed Dec. 21, 1950 5 Sheets-Sheet 4

INVENTORS
William C. Speed
James J. Dwyer
BY
Pennie, Edmonds, Morton & Barrows
ATTORNEYS July 14, 1953 W. C. SPEED ET AL 2,645,270

PRODUCTION OF MAGNETIC SOUND TAPE

Filed Dec. 21, 1950 5 Sheets-Sheet 5

INVENTORS
William C. Speed
James J. Dwyer
BY
Rennie, Edmonds, Morton & Barrows
ATTORNEYS Patented July 14, 1953 2,645,270

UNITED STATES PATENT OFFICE 2,645,270

PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 21, 1950, Serial No. 201,985

12 Claims. (Cl. 154—42.3)

This invention relates to the production of magnetic recording tape and has for its object certain improvements in the method of and apparatus for producing such tape.

It is customary in the production of magnetic tape for sound recording and sound reproducing to place a coating of free-flowing magnetic material on a relatively long and narrow tape base. After the coating is dried the tape base is cut or slit into a plurality of pieces of magnetic tape that are very much narrower than the tape base. The long pieces of tape are then cut ordinarily into shorter pieces, which are wound on reels.

Various tape base materials are used, such as paper, plastic, etc. The most common ones today are paper and cellulose acetate. Various magnetic materials may be used to coat the tape base. The one most commonly used at the present time is very finely divided magnetic oxide of iron produced artificially. A dispersion of the magnetic material in a suitable liquid vehicle or carrier is prepared. The resulting free-flowing magnetic material is then placed as a layer on one side of the tape base.

No matter how carefully the tape base is made and how carefully the coating operation is conducted, difficulties arise which affect the quality of the resulting magnetic tape. The tape base itself may have an occasional pimple or berry-like projection; or a foreign particle may be deposited on and cling to the tape base during the coating operation. Such obstructions are objectionable on several accounts: They affect the sound-recording and sound-reproducing characteristics of the tape. They affect the thickness of the coating, with the same result. They may cause physical damage to the tape base while it is being coated.

A continuous coating of optimum uniform thickness is required for high quality sound recording and sound reproducing. Such a coating is sometimes not obtained here and there on the tape base for various reasons and the sound recording and sound reproducing characteristics of the tape are therefore impaired.

Fortunately, sections of the tape base that contain obstructions; that are damaged; or that are impaired otherwise, such as by irregularities in the coating, may now be suitably noted, for example, as disclosed in copending application, Serial No. 201,974 filed December 21, 1950, simultaneously with this application.

When operating in accordance with the present invention, those sections may be readily eliminated. They are cut out and the main ends of the coated tape base are spliced in a manner that does not impair the sound-recording and sound-reproducing characteristics of the tape obtained therefrom.

The coated tape base may be accurately and efficiently cut or slit into a plurality of pieces of magnetic tape. Waste outer side pieces of the tape base may be continuously removed, and the inner pieces may be substantially continuously cut into desired lengths and wound onto reels.

These and other features of the invention will be better understood by referring to the accompanying drawings, taken in conjunction with the following description, in which Figs. 1 to 12 show various views of an apparatus, illustrative of a practice of the invention, adapted for splicing and cutting the tape base into a plurality of pieces of tape; and for winding or reeling and binding the pieces of tape into rolls; and in which Figs. 13 to 39 show various ways in which the apparatus may be used for such purposes, Figs. 13 to 25 being directed essentially to the splicing operation, Figs. 26 to 28 and 32 to 39 to the binding operation, and Figs. 29 to 39 to the tape winding or reeling operation.

Referring to the drawings in more detail:

Fig. 1 is a side elevation, partly in section on the line 1—1 of Figs. 2 and 3; Fig. 2 is a plan view, showing successively from right to left a tape base charging or feeding zone A; a tape base splicing zone B; a safety zone C; a tape base main cutting zone D; a power driven tape gripping zone E; an outer side pieces of tape removal zone F; a tape separating zone G; a tape winding or reeling zone H; and a reel exchanging zone I;

Figure 1:
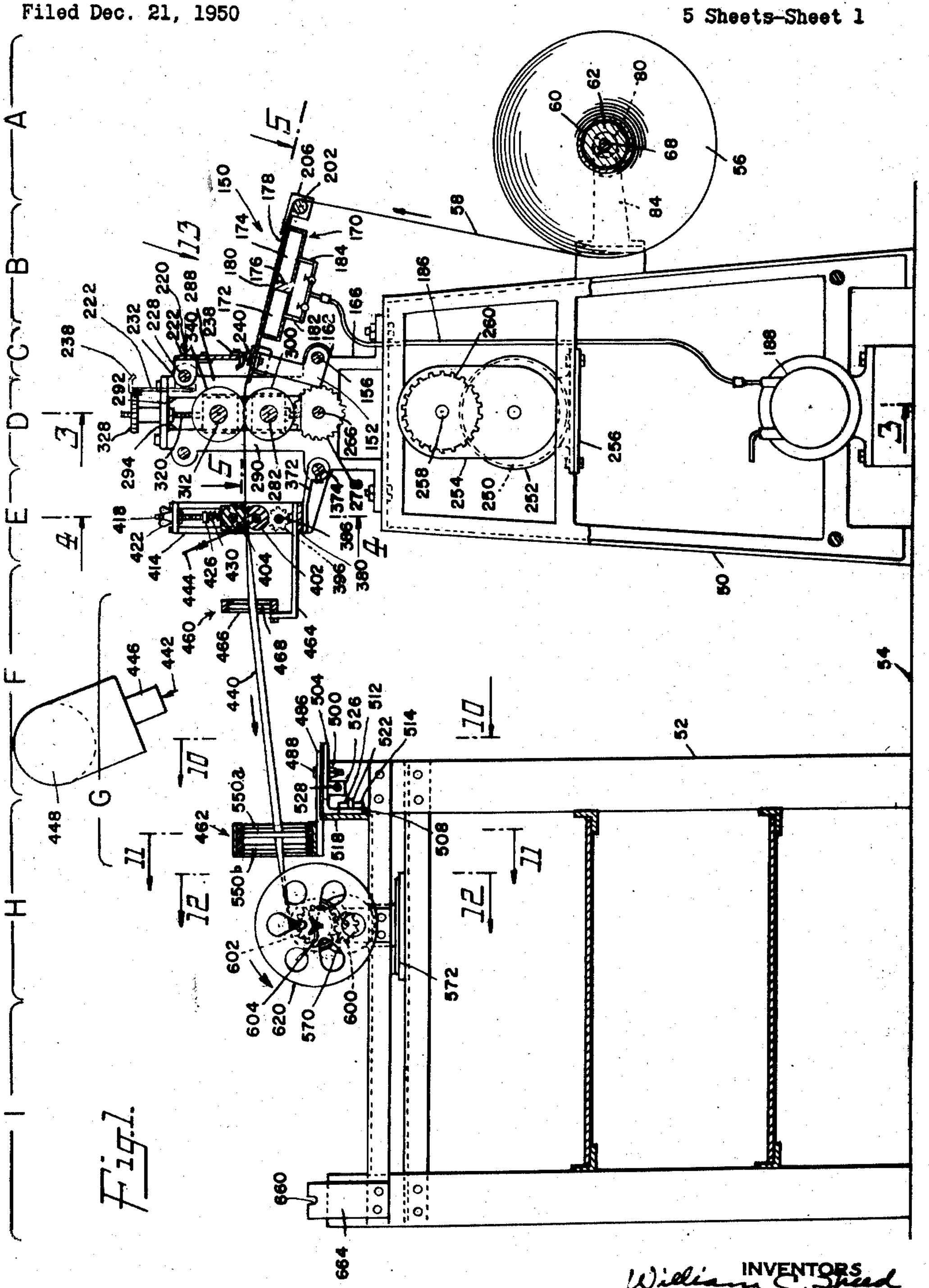

The apparatus shown includes two spaced frames 50 and 52 firmly secured to a floor 54. The first frame supports that much of the apparatus required for zones A, B, C, D and E, as well as a part of zones F and G; the second frame supports that much of the apparatus required for the remaining part of zone G, and all of zones H and I; while the remaining part of zone F is otherwise supported.

*Tape base charging zone A*

Returning to zone A (Figs. 1, 2 and 7) for charging or feeding a roll 56 of tape base 58 for processing in accordance with the invention, it will be noted that the roll is wound on a hub 60 into which is fitted a core 62 secured by collars 64 and 66 to a shaft 68 extending transversely of the apparatus; the core being provided with a key 70 adapted to fit into a complementary keyway 72 in the hub so that the latter is removable for reuse. The ends 74 and 76 of the shaft fit rotatably in upright journal slots 78 and 80 provided at the free ends of rearwardly projecting brackets 82 and 84 bolted at their other ends to lateral supports 86 and 88 in turn bolted to the frame 50.

Figures 2, 7, 10, 11, 12:
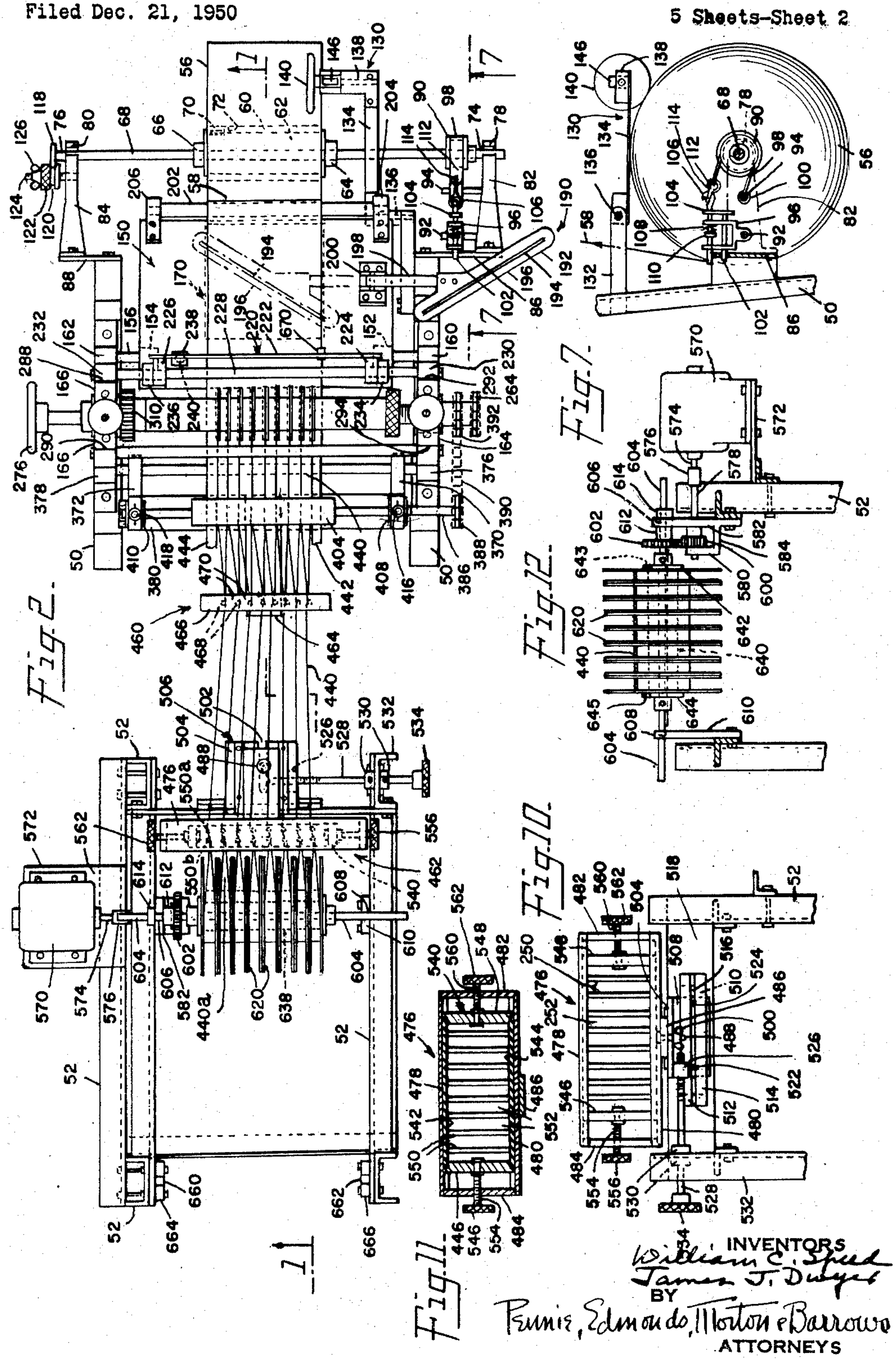
Fig. 7 is a section on the line 7—7 of Fig. 2, showing the manner in which a roll of tape base is mounted at the charging end of the apparatus preparatory to being sent therethrough, for splicing, if necessary, cutting and winding into rolls.
Fig. 10 is a section on the line 10—10.
Fig. 11 is a section on the line 11—11 of Fig. 1, showing an expansible multi-tape separating and aligning device in advance of the reels.
Fig. 12 is a section on the line 12—12 of Fig. 1, showing a multi-reel device for winding simultaneously the pieces of tape into separate rolls.

As shown more particularly in Figs. 7 and 1, a grooved brake disc 90 is integrally mounted on near end 74 of the shaft, adjacent bracket 82. A pair of spaced rods 92 and 94 is attached to the bracket, extending inwardly toward the roll. A bifurcated yoke 96 is mounted at its base on the first rod. One end of a flexible brake band 98 terminates in a ring 100 fitting around the second rod. A third rod 102, secured at one end to lateral support 86, extends through the lower part of both arms of the yoke, the other end of the rod being attached to the lower end of a vertical support 104. An adjustable hook-rod 106 extends through the upper part of the vertical support as well as through the upper parts of the two arms of the yoke. The portion of the hook-rod disposed between the two arms of the yoke is fitted with a spring 108 and a fixable collar 110. The other end of the retaining band terminates in a ring 112 to which is attached a link 114 adapted to fit over the hook of hook-rod 106. The construction shown permits the shaft and hence the roll of tape base to be placed under a suitable amount of brake action so that the unwinding of the tape base may be kept under control.

End 76 of shaft 68 is provided with an integrally secured guide disc 118 adapted to fit in a groove 120 in a knurled adjustable member 122 mounted on a threaded rod 124 integrally secured at one end to bracket 84. The upper end of the threaded rod is fitted with a lock wing nut 126. It will be clear from the construction shown that the adjustable member is adapted to move shaft 68 laterally in journal slots 78 and 80 in brackets 82 and 84. If, for example, the shaft is to be moved toward near bracket 82, lock wing nut 126 is loosened so that knurled adjustable member 122 may be turned inwardly on fixed rod 124. The lock nut is then tightened to hold the adjustable member and hence the shaft in the adjusted position. On the other hand, if the shaft is to be moved toward far bracket 84, the adjustable member must be turned outwardly on its fixed rod.

A linear length or footage counter device 130 (Figs. 2 and 7) is associated with the mechanism described, particularly in relation to roll 56, and hence core 62 on shaft 68. It includes a rearwardly extending support 132 integrally secured at one end to frame 50. An adjustable arm 134 is pivotally secured at 136 to the other end of the support. An inwardly extending support 138 is integrally secured to the other end of the arm. The latter support is provided with a rotatable disc 140 mounted on one end of the shaft of a counter mechanism, secured to the inwardly extending support, which is also provided with a footage indicator 146. As particularly shown in Fig. 2, the rotatable disc extends across the roll of tape. Arm 134 may be lowered, therefore, so that the disc engages the roll of tape frictionally. As the roll rotates with its shaft during the unwinding of tape base, the disc turns and hence operates the counter mechanism so that the linear length, usually a measure in feet, of the tape base leaving the roll is determined.

*Tape Base splicing zone B*

Going next to the tape base splicing zone (Figs. 1 and 2), the apparatus includes a platform 150 preferably inclined upwardly; and over which the tape base may travel on its way for processing. The platform is secured at its left or upper end to and is supported by a pair of spaced brackets 152 and 154 pivotally mounted on the inner ends of a rod 156. The outer ends of the rods fit in journals 160 and 162 secured to a pair of spaced standards 164 and 166 secured to the top of frame 50. The brackets may be pivoted to give the platform a desired tilt, after which they may be suitably locked, such as by set screws, to the rods.

Figures 3, 4, 5, 6, 8, 9:
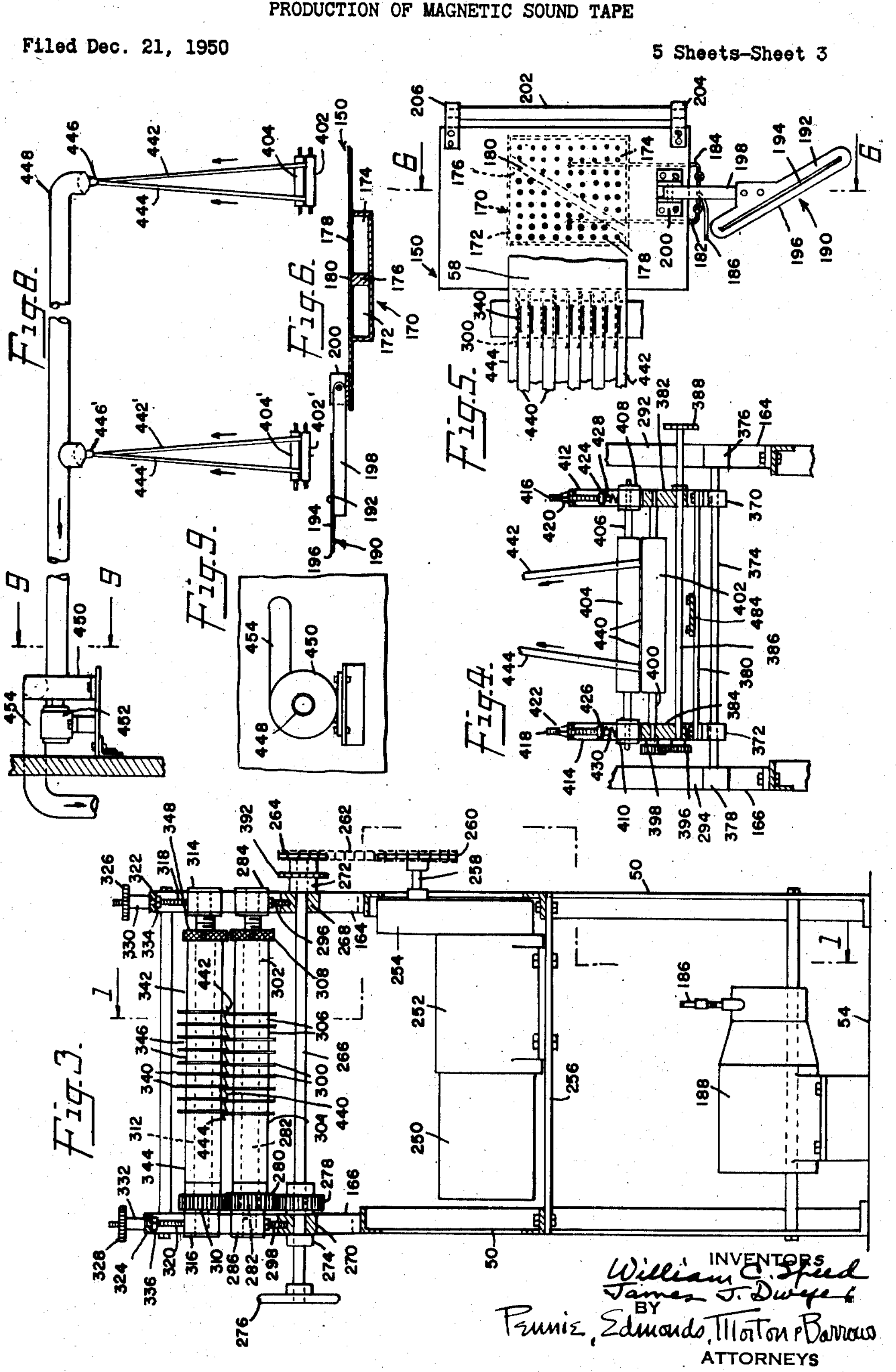
Fig 3 is a section on the line 3—3 of Fig. 1, showing the cutters for cutting the tape base into a plurality of tapes, each to be separated and wound into a roll.
Fig. 4 is a section on the line 4—4 of Fig. 1, showing the manner in which the unwanted cut marginal side portions of the tape base are separated from the wanted cut pieces of tape to effect their removal.
Fig. 5 is a section on the line 5—5 of Fig. 1, showing the top of the splice box and the cutters.
Fig. 6 is a section on the line 6—6 of Fig. 5, showing a portion of the interior of the splice box.
Fig. 8 is a side elevation of a suction device for removing the unwanted marginal side portions of the coated tape base.
Fig. 9 is a section on the line 9—9 of Fig. 8, showing a suction fan for withdrawing the unwanted marginal side portions of the tape base.

The underside of the platform is provided with a suction box 170 divided into two, upper and lower, compartments 172 and 174 by a partition 176. As shown in Fig. 5, the portion of the platform immediately above the suction box is perforated with a plurality of small holes 178, except for a narrow transverse cutting area 180 extending diagonally at an angle of about 60° over the suction box directly above the partition; the purpose of which is discussed below. Returning to Fig. 1, valved branch conduits 182 and 184 connect the compartments with a main conduit 186 leading to a vacuum pump 188 inside of and at the bottom of frame 50.

A cutting guide 190 (Fig. 2) is placeable over cutting area 180. It is in the form of a narrow flat plate 192 with an elongated centrally disposed straight cutting slot 194, and an outer straight cutting edge 196 parallel to the cutting slot; the purpose of which is discussed below. The plate is secured to one end of a lateral support 198 pivotally secured at the other end to a bracket 200 in turn fastened to the near side of the platform. As shown in dotted outline (Fig. 2) the cutting guide may be swung directly over cutting area 180 at the same diagonal angle.

The lower end of the platform, as shown in Figs. 1, 2 and 5, is provided with a transverse roller 202 the ends of which fit in journaled brackets 204 and 206 secured to and extending from the lower end of the platform. The arrangement is such that the top of the roller is in substantial alignment with the top surface of the platform. The tape base 58 may then be passed smoothly from roll 56 over the roller and upwardly over the platform.

While the need for splicing the tape base may not be frequent, particularly when the production operation as a whole goes smoothly, it is necessary at times. When, for example, roll 56 of tape base is exhausted before the final reels of cut tape are fully wound, another roll 56 of tape base must be placed in position for charging or feeding. The forward end of the tape base on the second roll must, therefore, be spliced to the rearward end of the tape base from the first roll.

The tape base is sometimes torn or otherwise damaged in handling after it has been coated and wound on a large roll. The torn or damaged part is cut out and the main ends of the tape base are then spliced.

Defects, such as pimples, berries, or other enlarged portions, may exist in the tape base itself, before it is coated. They may be noted and marked during the coating operation for subsequent treatment. That treatment occurs advantageously when the affected area of the tape base reaches the present splicing zone.

Defects in the tape base may occur during the magnetic coating operation. For example, the coating may not be uniform in transverse thickness; it may be too thick or too thin, etc. In any event, the affected areas likewise may be noted and marked for subsequent elimination, such as in the present splicing zone.

Whatever it is that makes a splice necessary or desirable, it may be assumed for the moment that the tape base is being pulled across the top of the splicing platform and that an undesired section previously noted is to be cut out. When the section reaches the splicing zone, the machine is stopped. The extent of the affected section is noted and then suitably cut out. This may be done by tearing or cutting the tape base. The fact that the main ends are tattered or irregular makes no difference.

Figures 13, 14, 15, 16, 17, 18, 19, 20, 21, 22, 23, 24, 25:
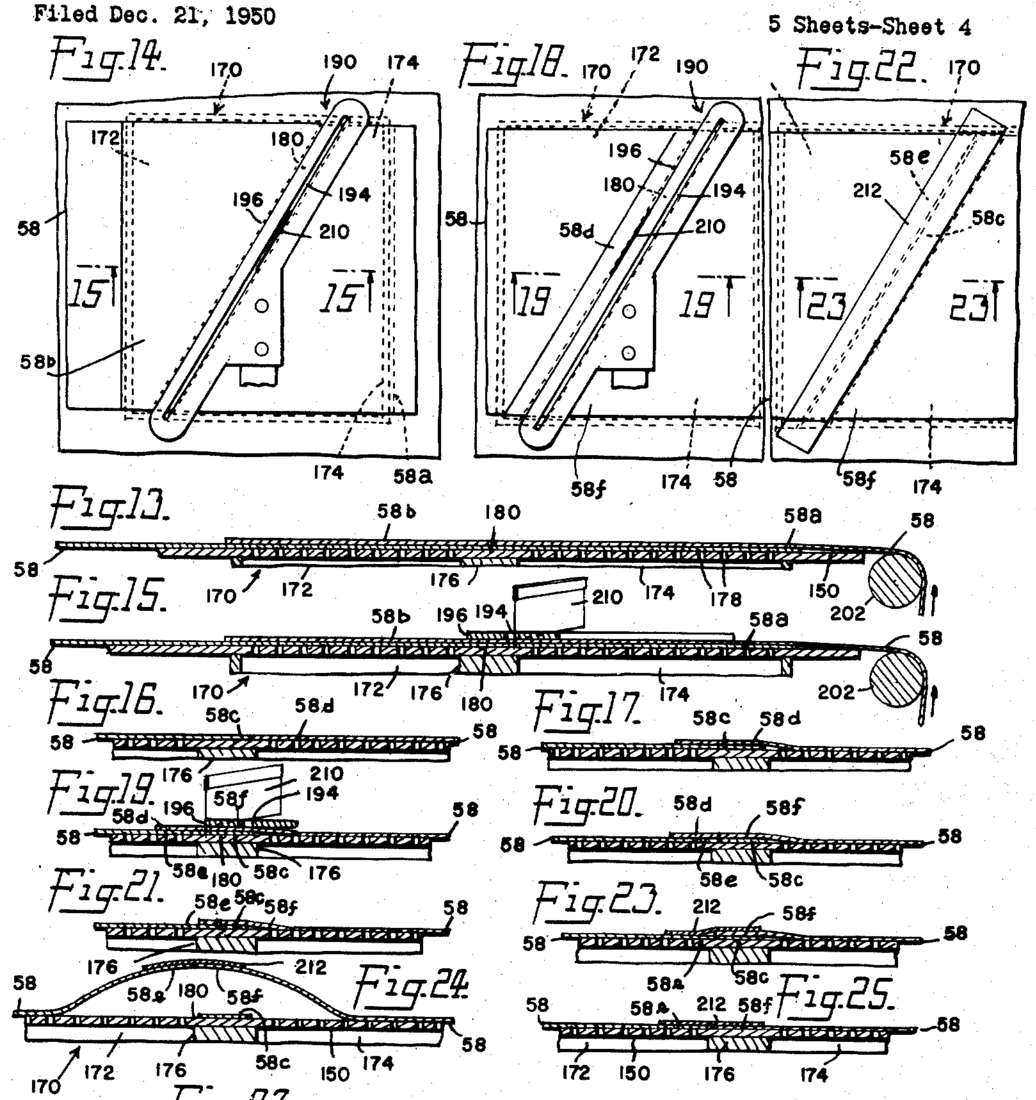
Figs. 13 to 39, as indicated, are various views showing how certain portions of the apparatus may be used in splicing, cutting and winding the tape into rolls.
Figure 27:
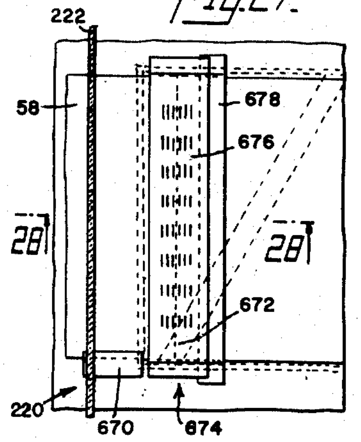
Figures 26, 28:
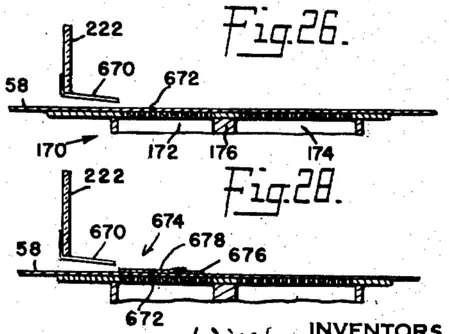

Figs. 13 to 25 may now be considered to determine the successive steps that may be employed advantageously to splice the main ends, which are designated initially as 58*a* and 58*b*. They are overlapped as shown in Fig. 13; the former being underneath and both of them being over perforations 178 in the portion of splicing platform 150 above suction box 170. Vacuum pump 188 is placed in operation; valves in branch conduits 182 and 184 are opened; and compartments 172 and 174 of the suction box are placed under suction. Since end 58*a* is shown extending completely across the top of the suction box, it is drawn tightly against the splicing platform. End 58*b* is not, and need not be, under suction for the first cut. However, the ends may be arranged, if desired, so that both of them are under suction. This can be done by shortening end 58*a*.

Cutting guide 190 (Figs. 2 and 5) is swung over and down on the overlapping ends (Fig. 14). The operator then places a cutter 210, such as a safety razor blade, in and draws it completely through slot 194 of the cutting guide (Fig. 15), which is near the lower side of cutting area 180. Ends 58*a* and 58*b* are cut off, leaving two new main ends 58*c* and 58*d*. Old end 58*b* is removed; new end 58*d* is lifted and old end 58*a* is removed, thus leaving the two new main ends (Fig. 16). End 58*d* is lifted and pulled upwardly a short distance to span the cutting area and to overlap end 56*c* (Fig. 17).

Cutting guide 190 is then swung back and placed over the overlapping ends (Fig. 18); and the operator makes another but different kind of cut. This time he draws the razor blade along straight cutting edge 196 (instead of slot 194) which is near the upper side of cutting area 180 (Fig. 19), a section on the line 19—19 of Fig. 18). The spacing of the lines of cut operates to space the amount of overlap. The cutting guide is again swung away, leaving cut-off ends 58*c* and 58*d* and new and final main ends 58*e* and 58*f* (Figs. 19 and 20). Top cut-off end 58*d* is removed; thus leaving cut-off end 58*c* below new main end 58*f* (Fig. 21).

The first cut, which is done by drawing the razor blade through the cutting slot of the cutting guide, is preparatory in nature. It need not be so accurate as to assure a straight line end-to-end relationship between the main ends of the tape base. Its main purpose is to eliminate relatively long overlapping ends of the tape base and thus to facilitate the second cutting operation when the amount of overlap is quite small and when both ends are under adequate suction to hold them securely in position, so that they may be cut with precision. The second cut is done along a straight edge which assures a sharp, straight, precise cut and thus a spliced joint line that is hardly visible to the eye. As a result of these successive steps, the spliced tape base is adapted to function as though it were a continuous whole; its sound-recording and sound-reproducing characteristics are not impaired because of the splice.

After the tape base is spliced it is ready for further processing in accordance with the invention. Before starting the machine so that the tape base may continue in its path of travel, the suction applied to the suction box is preferably not completely shut off. In a presently preferred practice the suction box is continuously under some suction so that the forward movement of the tape base over the platform is to a certain extent resisted. As will be pointed out below, this facilitates the cutting operation when the tape base is cut into a plurality of relatively narrow pieces of tape.

*Safety zone C*

A safety device 220 (Figs. 1 and 2) is located at the upper end of platform 150 in advance of the cutting zone, which is quite dangerous, for the protection of the operator. It is in the form of a transverse transparent shield 222, such as a glass plate or a panel of plastic, secured along one side to a pair of spaced brackets 224 and 226 mounted on a shaft 228, the ends of which fit in journals 230 and 232 secured to standards 164 and 166. The position of the brackets is maintained by collars 234 and 236 secured to the shaft outwardly of and adjacent to the brackets.

A contact member 238 is secured to the other side of the safety shield, beyond the far side of the path of travel of the tape base over the platform (Fig. 2). It is adapted to make contact with a micro-switch 240 in the circuit of a motor, to be described below, employed to drive the machine. As shown in Fig. 1 the shield may be swiveled on shaft 228 into a lowered position shown in cross-section and into a raised position shown in dotted outline. The arrangement is such that when the shield is in its lowered position, with element 238 in operative engagement with the micro-switch, the circuit is closed and the motor therefore drives the machine, including a plurality of rotary cutters. On the other hand, if the operator wishes to stop the machine, he can pull the shield into the raised position. Contact member 238 is disengaged from micro-switch 240 and the circuit with the motor is broken, opened. The operator cannot have the machine, and hence the rotary cutters, running unless the safety shield is in its lowered position which at the same time makes it impossible for him to place his fingers or hand near the cutters.

In addition to serving as a safety measure, the shield may be used by the operator to start and stop the machine; although a regular switch, not shown, is ordinarily used for starting and stopping the machine. Shield 222 functions primarily as a safety feature. It must always be down when the machine operates. Even though the regular switch is operated to start the machine, it will not start until the shield is down.

*Tape base main cutting zone D*

The driving means just referred to are located in tape base driving and cutting zone D (Figs. 1, 2 and 3). Going to Fig. 3, it will be noted that a motor 250 and interconnected gear reducers 252 and 254 are securely mounted on a platform 256 extending transversely of and within frame 50. The latter gear reducer is provided with a laterally extending drive shaft 258, to the end of which is secured a sprocket wheel 260 fitted with a sprocket chain 262. The sprocket chain extends upwardly around a second sprocket wheel 264 mounted on the end of a shaft 266 extending transversely of and resting in a pair of spaced bearings 268 and 270 in standards 164 and 166. The shaft is maintained in position with respect to the standards by collars 272 and 274. A hand wheel 276 is mounted on the other end of the shaft. As will be explained below, the hand wheel is used in stringing the tape base in the machine in advance of and in preparation for use of the motor.

Still referring to Fig. 3, a gear 278 is mounted on shaft 266 inside of and adjacent standard 166. This gear meshes with another gear 280 mounted on a superposed shaft 282 mounted in a pair of spaced journal boxes 284 and 286 movably suspended between a pair of vertical side members 288 and 290 of standard 166 and a similar pair of vertical members 292 and 294 of standard 164. The journal boxes are grooved so that each one is movable between its pair of vertical members. The journal boxes rest on set screws 296 and 298 extending into bearings 268 and 270. The set screws may be moved up or down in order to position the journal boxes and hence shaft 282. The shaft is fitted with a plurality of spaced rotary cutters or knives 300 mounted loosely thereon intermediate the ends of the shaft. They are held in position by end spacers 302 and 304 and by intermediate spacers 306 between adjacent rotary cutters. A knurled retainer ring 308 is mounted on the right end of the shaft. Both of them are threaded so that the retainer ring may be turned in order to force the spacers securely against the rotary cutters, thus locking them into a substantially integral unit. When this has been done, a set screw in the retainer ring is turned to lock it to the shaft.

Continuing with Fig. 3, gear 280 on shaft 282 meshes with a similar gear 310 mounted on a similar superposed shaft 312. The latter shaft rests in a pair of spaced journal boxes 314 and 316 also movably suspended between the pair of vertical side members 288 and 290 of standard 166 and the pair of members 292 and 294 of standard 164. The journal boxes are also grooved so that each one is movable between its pair of vertical members. The journal boxes are suspended from a pair of threaded rods 318 and 320 which extend upwardly through top plates 322 and 324 secured to vertical members 288, 290 and 292, 294. The upper ends of the threaded rods are provided with turn wheels 326 and 328, and sleeves 330 and 332 above the top plates and locknuts 334 and 336 below the top plates. The turn wheels and the locknuts may be suitably moved up or down the threaded rods in order to position the journal boxes and hence shaft 312 with respect to shaft 282. The former shaft is also fitted with a plurality of spaced rotary cutters or knives 340 mounted loosely thereon intermediate the ends of the shaft. They are held in position by end spacers 342 and 344 and by intermediate spacers 346 between adjacent rotary cutters. As shown the rotary cutters 340 and 300 are arranged in complementary pairs so that each pair overlaps a suitable distance, for optimum cutting. A knurled retainer ring 348 is mounted on the right end of the shaft. Both of them are threaded so that the retainer ring may be turned to force the spacers against the rotary cutters thus locking them into a substantially integral unit. When this is done a set screw in the retainer ring is turned to lock it to the shaft.

As the forward end of tape base 58 from roll 56 is pulled manually over splicing platform 150 and under safety device 220, the operator pushes it between rotary cutters 300 and 340. He turns hand wheel 276, and hence the rotary cutters, in a direction to pull the tape base between them. Even though done by hand, the tape base is cut into a plurality of pieces of tape. Any initial adjustments necessary to make the operation go smoothly are now made; such, for example, as moving retainer rings 308 and 348 further to the left to tighten the spacers against the rotary cutters; or adjusting the positions of the shafts 282 and 312 with respect to each other by turning set screws 296 and 298 as well as turn wheels 326 and 328 and lock nuts 322 and 324.

*Power driven tape gripping zone E*

The plurality of pieces of tape from cutting zone D are initially fed by hand into power driven gripping zone E. The apparatus shown (Figs. 1, 2, 3, and 4) includes a pair of spaced brackets 370 and 372 (Fig. 4) integrally mounted on a shaft 374 extending transversely through a bearing 376 in vertical member 292 of standard 164 and a bearing 378 in vertical member 294 of standard 166. A cross plate 380 is secured to the tops of the brackets. A pair of forwardly extending spaced standards 382 and 384 is in turn secured to the cross plate. A drive shaft 386 extends through the two vertical base members of the standards. One end of the shaft, outwardly of the vertical base member of standard 382, is fitted with a sprocket wheel 388, which is in turn fitted with a sprocket chain 390 (Fig. 2) extending over a sprocket wheel 392 in the driving zone mounted on shaft 266 (Fig. 3), adjacent sprocket wheel 264 also mounted thereon.

This construction permits the transmission of power from motor 250 through driven shaft 266 and sprocket wheel 392 (Fig. 3), through sprocket chain 390 and sprocket wheel 388 to shaft 386 (Figs. 2 and 4).

A gear 396 is mounted (Fig. 4) on the other end of drive shaft 386, outwardly of the vertical base member of standard 384. This gear in turn meshes with an upper gear 398 mounted on the end of a shaft 400 extending transversely of the gripping zone, being supported in bearings in the vertical base members of standards 384 and 382. A rubber gripping roller 402 is integrally mounted on the shaft intermediate its ends.

A similar rubber gripping roller 404 is mounted on a shaft 406 directly above roller 402 and shaft 400. The ends of the upper shaft rest in grooved journal boxes 408 and 410 movable in bifurcated yokes 412 and 414 secured to the tops of the vertical base members of the standards 382 and 384. Threaded vertical rods 416 and 418 extended through the tops of the yokes into the space between their arms. The upper ends of the rods are fitted with wing nuts 420 and 422. Retainer rings 424 and 426 are fitted near the lower ends of the rods, leaving the free ends of the rods to depend into spring coils 428 and 430. Since upper gripping roller 404, its shaft 406 and journal boxes 408 and 410 rest by gravity on lower gripping roller 402, the amount of gripping pressure between the two rollers may be regulated and maintained by suitably turning wing nuts 402 and 422 on rods 416 and 418.

All of the pieces of cut tape, including the unwanted marginal edge portions, from cutting zone D are fed to and passed between the gripping rollers manually by the operator. The turning of the rollers is effected by turning hand wheel 276, as already described. As the wheel is turned, therefore, tape base advances to and is cut by the rotary cutters; and the cut pieces of tape advance to and pass between the gripping rollers.

*Outer side pieces of tape removal zone F*

When the tape base is coated with magnetic material, it is customary not to coat the marginal edge portions. In other words, the coating itself extends transversely across all of the tape base except a narrow strip along each side. Tape base 58 in roll 56 may be considered in this form. When, therefore, the coated tape base is cut or slit in zone D into a plurality of pieces of tape, the pieces wanted are those completely coated. The incompletely coated side or edge pieces are not wanted. A zone is therefore provided for their separation and removal (Figs. 1, 2, 3, 4, 5 and 8).

As tape base 58 passes through cutting zone D (Fig. 3), it is cut (*a*) into a plurality of coated inner pieces of tape 440, located between adjacent pairs of juxtaposed rotary cutters, and (*b*) into two incompletely coated outer side or edge portions 442 and 444. As the desired inner pieces and the undesired outer pieces of tape leave gripping zone E, the operator grasps the outer pieces and inserts them (Fig. 8) in an inlet 446 of a suction conduit 448 terminating in a suction fan 450 operated by a motor 452. The fan connects with an outlet conduit 454 communicating with a collecting hopper, not shown, placed outside of the building. The fan is adapted to macerate the pieces of tape into a multitude of small pieces to facilitate handling.

In the present practice of the invention two pieces of apparatus like the one shown are in use. They are placed alongside of one another. This is indicated in Fig. 8 by designating the gripping rollers as 402′ and 404′ and the outer pieces of tape as 442′ and 444′ leading to inlet 446′.

*Cut tape separating zone G*

The operator's first concern is, of course, with the plurality of inner tape pieces 400. In the present practice of the invention, the tape base is about six inches wide and it is cut into twenty-two inner pieces of tape; although the drawings illustrate a lesser number for convenience. The tape base may, of course, be wider or narrower, the width selected being more or less arbitrary.

In any event, the inner pieces of tape are separated in zone G to facilitate their winding or reeling in zone H. To this end the apparatus (Figs. 1, 2, 10 and 11) includes a pair of spaced separators or "combs" 460 and 462. The first separator is formed of a lateral support 464 (Fig. 1) secured to and extending forwardly from cross plate 380 on brackets 372 in gripping zone E; and a vertically disposed rectangular frame 466 securely mounted on the far end of the support, in the path of travel of the cut inner pieces of tape. The frame consists of top, bottom and side pieces fastened to each other. A plurality of closely spaced rods 468 extend vertically of the frame, the lower ends of the rods being secured to the bottom and the upper ends of the rods to the top of the frame. The spacing of the rods provides a plurality of vertical spaces 470 through which the operator strings the forward ends of the inner tape pieces, the pieces of tape being given a half-turn to cause them to go edgewise through the spaces. Since this arrangement of the rods simulates the teeth of a comb, the device is often referred to by the operators as a comb.

As shown in Figs. 1 and 2, whereas the pieces of tape come through gripping zone E while horizontally disposed, they pass through spaces 470 in sliding contact with the intermediate portions of the vertical rods in a vertically disposed position. In other words, the pieces of tape are given a half turn in the space between the gripping rollers and the frame. The pieces of tape are advanced in this manner so that they will not become jammed between the rods, and so that their edges will not rub against the rods or the top and bottom of the frame—thus preventing damage to the pieces of tape.

The second separator or comb 462 functions in somewhat the same manner as the first separator or comb, although it differs substantially in construction because of certain adjustable features. As shown in Figs. 10 and 11 particularly, it is in the form of a rectangular outer frame 476 having a top 478, a bottom 480 and two ends 482 and 484. The outer frame is secured at its bottom to a flat rearwardly extending support 486 having a centrally disposed hole near its free end fitted with a bolt 488 and a wing nut 500. The bolt extends downwardly into a rearwardly extending slot 502 in the top leg 504 of a slidable angle support 506. The lower leg 508 depends loosely in an inner slot 510 disposed behind a pair of spaced outer horizontal members 512 and 514. The two outer members are spaced from one another in parallel relationship to provide a horizontal outer slot 516, which communicates with the inner slot.

The spaced members are not only spaced from each other as one views Fig. 10, for example, but they are spaced from and secured to a back support 518 fastened to frame 52. A pair of spaced rods 522 and 524 is secured to lower leg 508 of the angle support, the rods extending through outer slot 516. A holding block 526 is secured to the under left side of top leg 504. The inner end of a threaded rod 528 is secured rotatably in a threaded hole in the holding block. The rod extends through collars 530 attached to the rod on opposite sides of a side member 532 of the frame, and terminates in a knurled hand wheel 534.

It will be seen from this construction that the turning of the hand wheel is adapted to move outer frame 476 of the second separator or comb 462 laterally to the left or right, as one views Fig. 10. This, of course, also moves the second separator or comb relatively to the first separator or comb 460, as well as to the tape winding or reeling zone H. When the two separators are placed in proper relation to each other and to the tape winding or reeling zone, wing nut 500 is fastened on bolt 488.

Now, referring particularly to Fig. 11, it will be noted that the second separator or comb 462 also includes an inner frame 540 fitting slidably inside outer frame 476. The inner frame is formed of a rubber top 542, a rubber bottom 544 and metal ends 546 and 548. As in the case of the first separator or comb 460, the inner frame of the second separator or comb is provided with a plurality of spaced vertical rods 550, arranged in pairs in two spaced rows 550*a* and 550*b*, the lower ends of the rods being secured to rubber bottom 544 and the upper ends of the rods being secured to rubber top 542. The spacing of the rods results in a plurality of spaces 552 through which the inner pieces of tape may pass in a zigzag manner, as shown. One end of a threaded rod 554 extends through and is rotatably secured to metal end 546 of the inner frame. The rod extends through a threaded hole in end 484 of outer frame 476. The rod terminates in a knurled hand wheel 556. In a similar manner, one end of a threaded rod 560 extends through and is rotatably secured to metal end 548 of the inner frame. The rod extends through a threaded hole in end 482 of outer frame 476. The rod terminates in a knurled hand wheel 562.

The construction of the inner frame is such as to make it horizontally expansible and contractible. It also follows that spaces 552 between vertical rods 550 are expansible and contractible. Thus, when hand wheel 556 or 562, or both, are turned to stretch rubber top 542 and rubber bottom 544, rods 550 are separated still farther. As this occurs spaces 552 necessarily are increased in width. On the other hand, when hand wheel 556 or 562, or both, are turned to compress rubber top 542 and rubber bottom 544, rods 550 are brought closer to each other, thereby decreasing the width of spaces 552.

It will thus be seen that the operator has a good deal of leeway in manipulating the second separator or comb. He cannot only move it laterally to the left or right with turn wheel 534, to adjust its position relative to the first separator or comb as well as to the tape winding or reeling zone, but he can increase or decrease the width of spaces 552 through which the pieces of tape are passed to the next zone in the series. As with the first separator or comb, the pieces of tape are passed vertically, rather than horizontally, through spaces 552, the flat faces of each piece of tape thus being brought in sliding or wiping contact with its pair of vertical rods 522.

*Tape winding or reeling zone H*

On passing through the second tape separator or comb, the pieces of tape enter the winding or reeling zone. As more particularly shown in Figs. 1, 2 and 12, the apparatus includes a torque motor 570 secured to a bracket 572 attached to frame 52. Its drive shaft 574 communicates with a coupling 576 connecting with a driven shaft 578 extending through the side of frame 52 and being supported in bearings in the arms 580 and 582 of a bifurcated yoke 584, the base of which is suitably attached to the inside of the frame at its top. A drive gear 600 is integrally mounted on the shaft inwardly of and adjacent to the left arm 580 of the yoke, as one views Fig. 12.

This gear in turn meshes with a driven gear 602 integrally mounted on an upper removable shaft 604 resting by gravity at its right end in a slot 606 (Fig. 2), in the upper portion of the right and higher arm 582 of the yoke, and at its left end in a similar slot 608 (Fig. 2) in a bracket support 610 secured to the opposite side of frame 52. The shaft is provided (Fig. 12) at its right end with two integrally secured spacers 612 and 614 adjacent the right arm 582 of the yoke to keep gears 600 and 602 in mesh.

Figures 33, 36, 37, 38, 39:
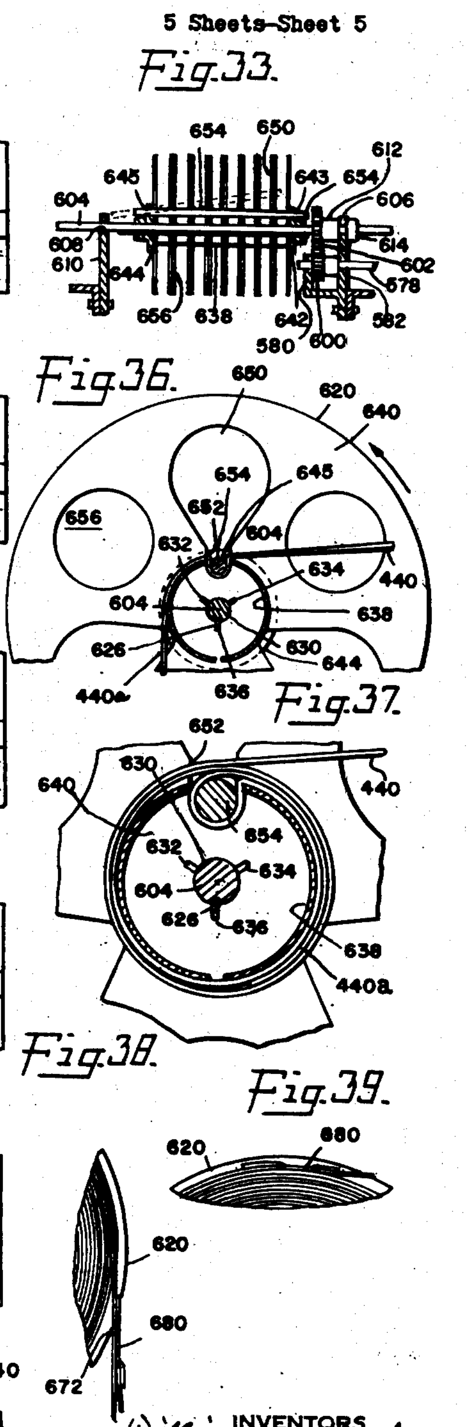

A plurality of reels 620 is mounted on shaft 604. They are kept in alignment (Figs. 1, 36 and 37 particularly) and locked on the shaft by a key 626. The shaft itself and its key fit in a corresponding shaft hole 630 and in one of three slots 632, 634 and 636 (the latter as shown in Fig. 36) in the hub portions 638 of the side walls 640 of the reels. The reels are also kept in contact with each other on the shaft by a retainer flange 642, with rod hole 643, integrally secured on its right end, adjacent gear 602, and a removable retainer flange 644, with a rod hole 645, on its left end (Fig. 12).

Referring more especially to Fig. 36, it will be noted that the side walls or flanges 640 of each reel are provided with a pair of complementary pear-shaped holes 650, the lower or smaller ends of which merge into a complementary hub slot 652, extending into the peripheral portions of the hub.

When mounting a plurality of the reels on shaft 604, for example as shown in Fig. 33, they are so placed that hub slots 652 of all of the reels are in alignment with each other. A retaining rod 654 is then inserted through the pear-shaped holes and the far end is pushed into rod hole 645 of flange 644. The near end of the retaining rod is then pushed into rod hole 643 of flange 642. The slots are sufficiently deep to accommodate the retaining rod so that its top surface is substantially in circumferential alignment with the exterior surfaces of the hubs in the reels.

In addition to a pear-shaped hole in each side wall or flange, which can be aligned with each other, the flanges are provided with additional holes 656 which may likewise be aligned. They reduce the weight of the reels and are also in effect peep-holes to determine the amount of tape on the reel. They may also be used for the insertion of shears to cut the tape, as will be described below.

It may at this stage be assumed that reels 620 are mounted on shaft 604; that their slots 652 are aligned at the top; that retainer flanges 642 and 644 are secured to the shaft to hold the reels in contact with each other; and that the operator has placed the shaft in slots 606 and 608

(Figs. 2 and 12). The forward ends 440a of pieces of tape 440 extending beyond the second separator or comb 462 are then given a half turn and placed in the reels over their respective hubs and slots. The ends 440a of the pieces of tape extend over the slots preferably several inches.

Retaining rod 654 is then passed laterally through aligned pear-shaped holes 650, over the pieces of tape; its far end is pushed into flange hole 645; the rod is pushed downwardly into the hub slots, and the near end of the rod is inserted in flange hole 643. This causes a portion of each piece of tape to be pushed downwardly in its hub slot, as illustrated in Fig. 36. Since the retaining rod fits fairly tightly in the slots as it bears against the depressed portions of the pieces of tape, it maintains its position as shaft 604 and the reels are rotated for the tape winding operation. After a few turns the pieces of tape are securely fastened to the hubs of the reels, and the rod may be withdrawn.

As one views Fig. 36, which is similar to viewing Fig. 1, the shaft and hence the reels rotate anti-clockwise. When this occurs, the ends 440a of the pieces of tape 440 tend to drop away from the hub; and the main portions of the pieces of tape are wound against the hub until the reels make a complete revolution, after which the main portions of the pieces of tape bear down on and lock the ends 440a during the second revolution of the reels.

*Power driven operation*

It has been assumed thus far that the operator placed roll 56 in position for unwinding (zone A), as shown in Figs. 1, 2 and 7; that he pulled tape base 58 from the roll over roller 202, splicing platform 150 (zone B) and, with safety shield 222 raised, (zone C) pushed the forward end of the tape base (zone D) into and between rotary cutters 300 and 340 (Fig. 3); that he then turned hand wheel 276, and hence the rotary cutters, to cut or slit the tape base into a plurality of desired inner tape pieces 440 and two undesired outer side pieces 442 and 444 (zone D); that the inner and outer pieces of tape were passed manually between gripping rollers 402 and 404 (zone E); that the outer pieces of tape were drawn by suction (zone F) through the removal device shown in Fig. 8; that the inner pieces of tape were then threaded manually through separators or combs 460 and 462 (zone G); and that the forward ends 440a of the pieces of tape were then secured to their respective reels 620 (zone H) in readiness for winding or reeling under power.

After these preliminary preparatory arrangements, the operator lowers safety shield 222 and throws the regular switch to close the circuits of motors 250 and 570. The latter motor is designed, in conjunction with the reels and the amount of tape thereon, to operate synchronously with the first motor so that the cut pieces of tape may be wound on the reels at the same rate at which the tape base is cut. Motor 570 is adapted to alter its speed as required while the pieces of tape are wound on the reels; that is to say, as the amount of tape wound on the reels increases, thus increasing the diameter of the roll of tape on each reel, motor 570 automatically decreases in speed to compensate for that increase in diameter. In this way the reels or hubs are rotated at whatever rate is required to wind up the pieces of tape as fast as they are cut by the rotary cutters.

The speed at which the machine is operated depends on a number of factors, including the skill of the operator. If the coated tape base itself is in optimum condition, so that objectionable sections need not be cut out, and splicing for that reason is not required, or if such objectionable sections are few and far apart, the machine itself may be run quite rapidly.

Among the improvements which permit rapid running of the machine are separators or combs 460 and 462. The manner in which the former is positioned with respect to the tape gripping rollers and the latter with respect to the shaft-reel assembly cause them also to function as aligners to the rollers and the reels as well as to each other. While a shaft-reel assembly is specifically shown, it will be clear that a shaft-hub assembly may be used. That is to say, the pieces of tape may be wound on hubs having no side flanges. What is then produced may be considered rolls, instead of reels, of tape. If the separators, at least one of them, particularly the latter one, were not interposed between the rollers and the reels or hubs, the rapidly moving pieces of tape would tend to have a good deal of lash or bounce, laterally and vertically, which would greatly impair the winding operation. The lashing or bouncing pieces of tape would tend to overlap, and to interlock with, each other to their damage. They would be apt to tear or become otherwise damaged as they enter the winding zone. Lashing or bouncing of the pieces of rapidly moving tape against the peripheral edges of the side flanges of the reels, as well as against the side walls of the flanges, would damage the coating on the pieces of tape and would cause the pieces of tape to wind irregularly, thus resulting in rolls of tape with irregular rather than smooth side surfaces. Much the same result would obtain if the pieces of tape were wound into rolls on hubs without side flanges. Such irregular side surfaces would in turn cause irregularities in the unwinding of the tape from the roll in subsequent sound recording and thus impair the quality of the recording.

While the use of a simple separator or comb with vertical or upright rods in straight line alignment with each other is of some help in overcoming disadvantages of the kind enumerated, when the machine is not operated rapidly, it is not adequate when the machine is operated rapidly. The pieces of tape would develop an objectionable lash or bounce in the space between the separator and the reels or hubs, as well as between the rollers and the separator.

In accordance with the present practice, however, such lash or bounce of the pieces of tape is inhibited and prevented. As already described and as shown in the drawings, each separator is provided with vertical rods between which the pieces of tape are strung. The first separator has a single row of closely spaced rods 468 that function to give the pieces of tape a half turn, so that as they advance to the second separator their flat faces are in spaced substantially parallel and vertical relationship to each other. As the pieces of tape pass through spaces 470 between the rods at least one of the flat faces of the pieces of tape tends to slide or wipe against an adjacent vertical rod.

To inhibit or prevent lash or bounce of the pieces of tape as they enter the winding zone to be wound on hubs with flanges, or on hubs without flanges, the second separator is differently constructed. As already pointed out it contains two rows 550a and 550b of aligned vertical rods 550 extending transversely across the path of travel of the pieces of tape. A pair of the rods, that is one rod in one row and one complementary rod in the other row, directly opposite each other in the rows, are utilized in order to obtain this desirable result. Each piece of tape is strung through its pair of rods in a zig-zag manner. This causes both flat faces of each piece of tape to slide or wipe against intermediate side portions of its pair of rods and therefore results in a form of gripping action. The gripping action is sufficiently strong to inhibit or prevent lash or bounce of the pieces of tape, and at the same time sufficiently weak to permit them to advance freely in their path of travel to the winding zone.

In order to get optimum results, the separator is placed near the winding zone; its position depending somewhat on the size of the hubs or reels and, therefore, on the size of the rolls of tape to be wound thereon. As a result of the gripping action between the pieces of tape and the rods, the movement of each piece of tape from the separator to the winding zone is extremely steady. It is so steady that relatively large rolls of tape may be wound with substantially smooth side surfaces on hubs without side flanges. On the other hand, if side flanges or reels are employed, the pieces of tape enter them for winding so steadily as not to be damaged by the side flanges or their peripheral edges.

As already noted, the second separator is adjustable with respect to the winding zone along the path of travel of the pieces of tape; and it is also adjustable laterally with respect to the spaces between the pairs of rods. The latter feature is particularly important because of the variations in width of the hubs and reels. The thickness of the metal or plastic going into the hubs and reels is apt to vary, thus causing a variation in their widths. Such variations are of course multiplied when a bank of hubs or reels is mounted on a single shaft. In a present practice twenty-two hubs or reels make up a bank, although a larger number may be employed. In any event, the construction of the second separator readily permits lateral adjustment of the spacings between the pairs of rods with respect to the spacings of the hubs or reels so that the pieces of tape advance directly thereto.

As also noted above, the pieces of tape between the separator and the winding zone are given a half turn as they are fastened to the hubs or reels. The direction of turn will depend on whether the coating of magnetic material is to be on the top or bottom of the pieces of tape.

If it is necessary or desirable to splice the tape base, the regular switch is thrown to break the circuit of the motors, and hence to stop them. After a splice has been made, as described above, the switch is reversed to close the circuit, and hence to start the motors so that the overall operation may be resumed.

In a preferred practice, suction box 170 is continuously under some suction to place the moving tape base under a certain amount of drag or tension as it enters and passes through the main cutting zone. The drag or tension tends to cause the tape base to go through the rotary cutters more smoothly and even to cause the cutters to cut the pieces of tape more smoothly. In Fig. 3 inner pieces 440 and outer pieces 442 and 444 of tape are shown in a somewhat exaggerated angle of cut with respect to the rotary cutters to point out more clearly the nature of the operation.

The operator can tell fairly well how many feet of tape have been wound on the reels merely by observing how far the wound tape has risen in the reels. For more precise guidance, however, he determines the amount of footage indicated by footage counter 130. Keeping in mind the number of feet between the footage counter and the reels, although it is advisable in any event to have a few extra feet of tape wound on the reels, he can determine when to stop the operation. To do this, he again lifts safety shield 222 to break the circuit and to stop the motors.

*Reel exchanging zone I*

Various procedures may then be followed to exchange a set of empty reels for the set of loaded reels in zone I. For example, the operator may tear or cut tape base 48 in the vicinity of splicing platform 150 or he may cut the pieces of tape 440 adjacent the reels. The difficulty with the first procedure is that he must then manually go through the steps just outlined in order to arrange for another power driven operation. The difficulty with the second procedure is that the pieces of tape rearward of the reels may spring back, at least through the second separator or comb, thus making it necessary again to string them through the separator and to attach them to another set of reels for winding.

In a presently preferred practice the power driven operation is continued until the reels (Fig. 29) are loaded, after which the switch is thrown to stop the motors. The operator then lifts the entire shaft-reel assembly, 604—620, by grasping the ends of shaft 604 (Fig. 2), lifting it out of slots 606 and 608, and placing it in a second pair of slots 660 and 662 in brackets 664 and 666 (Fig. 30) attached to the left end of frame 52. The two sets of slots are several feet apart to facilitate the shaft-reel exchange.

Another shaft-reel assembly, 604′—620′ (Fig. 31) is then placed in the first pair of slots 606 and 608. A retaining rod 654′, as before, is pushed downwardly (Fig. 32) across the pieces of tape to lock them onto the hubs of the new set of reels. The operator then cuts all of the pieces of tape across the portions extending from the first set of reels to the second set of reels.

The forward ends of the pieces of tape attached to the hubs of the second set of reels are preferably short. The operator may therefore make his cut by going through the nearest aligned holes 656 in the side flanges of the reels with a pair of shears 668, working from both sides of the assembly. He then pulls safety shield 222 down to start the motors; and loading of the new set of reels is started.

The operator's attention is then directed to the first shaft-reel assembly mounted in the second set of slots. It is turned by hand to take up the tail ends of the pieces of cut tape, which may be suitably fastened, for example by a piece of adhesive tape, if desired, to the rolls in the reels. The assembly is lifted and taken to a work bench for disassembly. Retainer flange 644 (Figs. 2 and 12) is loosened and removed. The loaded reels are then taken from the shaft. A set of empty reels is placed on the shaft; the retainer flange is replaced and tightened; and a new shaft-reel assembly is thus provided. It may be substituted later for the one simultaneously being loaded. It is clear that shaft-hub assemblies may likewise be employed.

*Tape binding operation*

In a presently preferred practice the tail end of the tape base being loaded on the reels is provided with tape tail end binding means before it is cut or slit into a plurality of pieces, so that the tail end of each piece of tape may be bound to its roll of tape in its reel. This is a highly advantageous procedure as may be gathered from the following explanation.

As shown in Figs. 2, 26, 27 and 28, a guide tab 670 of any suitable material is attached to the bottom of the safety shield directly above the near side of the tape base. The guide tab may be in the form of a piece of cardboard pasted to the shield with a rearwardly extending portion. The purpose of the tab is to guide the operator in cutting the tape base. When he notes that the reels are loaded with the desired amount of tape, he throws the switch to stop the machine and hence the tape base. He then cuts the tape base on a line of cut 672 (Fig. 26) a relatively short distance to the right of the guide tab. While the operator may use a straight edge to make the cut, in practice he merely runs a cutter, such as the razor blade used in the splicing operation described above, straight across the tape base in parallel relationship to the safety shield.

As already indicated, suction box 170 normally is under a slight amount of suction. This is sufficient ordinarily to hold the tape base for the cutting operation. If desired, however, the suction may readily be increased.

In any event after the cut has been made, a specially designed piece of adhesive binding tape 674 (Fig. 27) is applied over the adjacent ends of the tape base, adjacent the line of cut. The adhesive tape consists essentially of two main parts. A relatively broad splice part 676 with an adhesive undercoat and a relatively narrow tab part 678 with no adhesive adapted to be gripped by the fingers. In the instant construction the tab is secured to the underside of the splice piece, and extends rearwardly. The splice part is sufficiently broad to present a substantial amount of adhesive surface to both ends of the cut tape base. The portions of adhesive binding tape extending beyond the tape base are cut off so that they will not adhere to the cutters and rollers that follow.

The operator then throws the switch to close the circuit, start the motors, and cause the tape base to advance. It will be clear from what has already been said that as the tape base advances through cutting zone D, the adhesive binding tape and the magnetic tape base to which it is attached are cut simultaneously into a plurality of narrow inner pieces 680 and two narrow outer pieces.

Figures 29, 30, 31, 32, 34, 35:
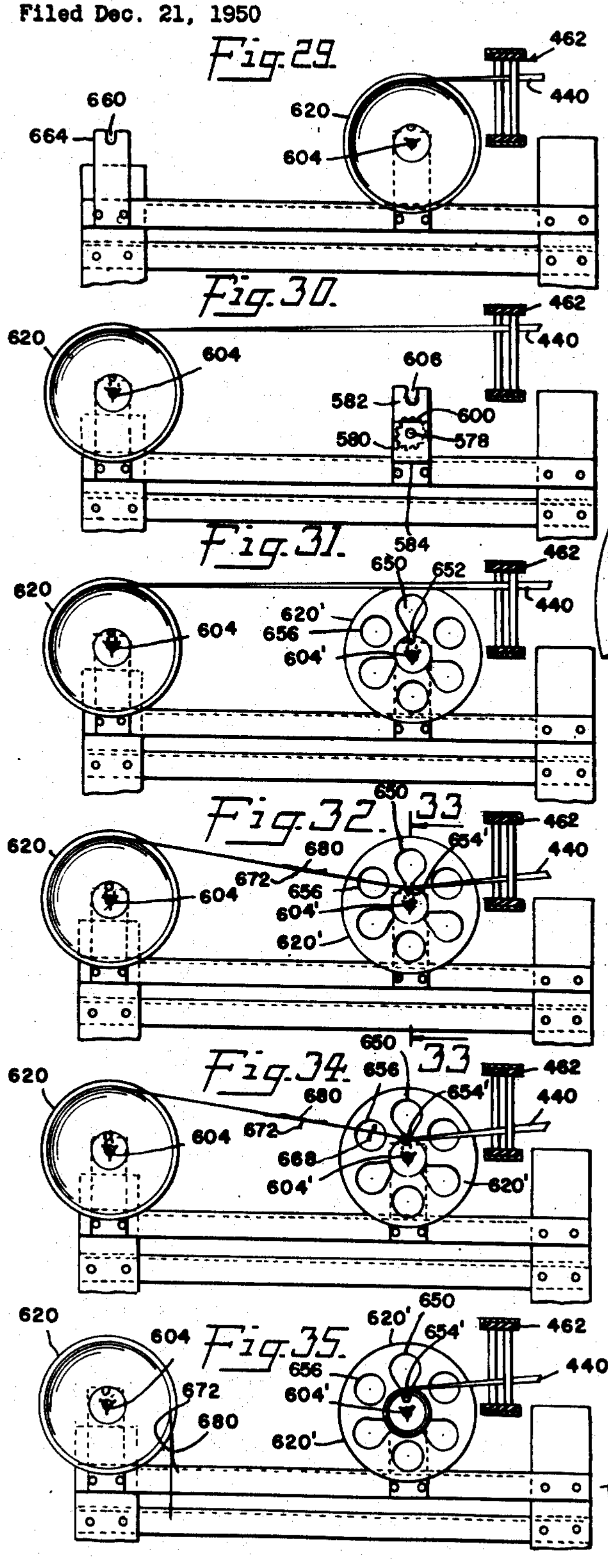

Each piece of adhesive binding tape advances with its piece of magnetic tape, still functioning to splice the cut ends. The two outer side pieces are removed through zone F, as described above, while the inner pieces advance to the reels. This is illustrated, for example, in Figs. 32, 34, 35 and 38. When the pieces of adhesive binding tape reach the place in their path of travel indicated in Fig. 32, the machine is stopped and an exchange of reel assemblies is made; such as already described, but with this difference. After the rearwardly extending pieces of magnetic tape are secured to the second reel assembly and they are cut, as shown in Figs. 34 and 35, the tab part of each piece of adhesive binding tape is grasped by the operator with the fingers of one hand and its piece of rearwardly extending magnetic tape is grasped with the fingers of the other hand. He then pulls them apart, thus breaking the splice and leaving the piece of adhesive binding tape secured to the tail end of the piece of magnetic tape. The freshly exposed adhesive portion of the adhesive binding tape is then pressed onto and is secured to the roll of magnetic tape (Fig. 39).

While the cutting guide, for example, permits two spaced and parallel lines of cut, and thus controls the amount of overlap of the ends of the tape base being spliced, either one or the other may be used to effect the splice. While rotary cutters are shown, other cutting or slitting means may be used to cut the tape base into a plurality of pieces of tape. It is possible to operate with a single well placed separator and aligner for the pieces of tape going to the winding zone. Those pieces, moreover, may be wound on hubs or reels not having a common axis. Thus, two or more banks of hubs or reels, at different levels, may be used simultaneously to wind the pieces of tape. The use of hubs, instead of reels, is particularly desirable for the larger rolls of tape, not so much because they facilitate the winding operation but rather because it is an economy not to have to use large reels. Special cartons have been developed for handling the larger rolls of tape on hubs in sound-recording and sound-reproducing operations, to make unnecessary the use of reels or of removable side flanges on the hubs. An advantage of the invention is that the rolls of tape may be readily wound on hubs useable with such cartons when using a suitable tape separator and aligner. A number of useful modifications will readily occur to those skilled in this art in view of the above disclosure.

It will be clear to those skilled in this art that the above example is only by way of illustration and that other useful modifications may be employed in the practice of the invention.

We claim:

1. In the method of producing sound-recording and sound-reproducing magnetic tape from a relatively long and narrow tape base coated with finely divided magnetic material, the improvement which comprises advancing the coated tape base from a roll in a charging zone to a main cutting zone; cutting the tape base lengthwise into a plurality of pieces of magnetic tape as it moves through the cutting zone; maintaining the flat faces of the pieces of magnetic tape in edge-to-edge relationship in substantially the same plane as they leave the cutting zone; separating the moving pieces of tape in a separating zone so that they are spaced from one another; giving each piece of tape a partial twist to place the pieces of tape in spaced face-to-face relationship while moving from the cutting zone into the separating zone to prevent lash thereof; giving each piece of tape a reverse partial twist to place the flat faces of the pieces of tape in their former spaced edge-to-edge relationship in substantially the same plane as they leave the separating zone for a winding zone; and winding the spaced pieces of tape separately and simultaneously into rolls as they move into the winding zone, the pieces of tape being wound with their outermost faces the same as the outermost face of the roll of tape base undergoing unwinding in the charging zone.

2. Method according to claim 1, in which the spaces between the pieces of magnetic tape are gradually widened as they pass through the separating zone to adapt them for winding into a plurality of spaced rolls having a common axis.

3. Method according to claim 1, in which the flat faces of the pieces of magnetic tape are in edge-to-edge relationship in substantially the same plane as they leave the cutting zone; each piece of tape is given a partial turn to place the pieces of tape in spaced face-to-face relationship while moving from the cutting zone into the separating zone; and each piece of tape is given another partial turn to place the flat faces of the pieces of tape in spaced edge-to-edge relationship in substantially the same plane as they leave the separating zone for the winding zone, the spaces between the pieces of magnetic tape are gradually widened as they pass through the separating zone to adapt them for winding into a plurality of spaced rolls having a common axis.

4. Method according to claim 1, in which the forward movement of the pieces of magnetic tape and of the coated tape base is stopped when a predetermined amount of tape is wound onto the rolls; the coated tape base is cut transversely in a splicing zone in advance of the main cutting zone; the adjacent ends of the coated tape base are spliced with a continuous adhesive tape binder band extending across the tape base; the forward movement of the pieces of magnetic tape and of the spliced tape base is resumed; the tape base and the adhesive tape base binder band are advanced to the main cutting zone; the tape base and the splice of adhesive tape binder band and tape base stuck thereto are cut into a plurality of pieces as they move through the cutting zone so that the tail end of each forward piece of magnetic tape is spliced by a piece of the adhesive tape binder to the forward end of the piece of tape that follows; the forward end of each piece of tape that follows is cut off near the adhesive tape binder; the cut off forward ends are separated from the pieces of adhesive tape binder; and the tail end of each forward piece of tape is bound to its roll of tape with its piece of adhesive tape binder.

5. Method according to claim 1, in which the coated tape base is cut lengthwise in the main cutting zone into two outer side pieces of waste tape and into a plurality of inner pieces of useful magnetic tape, and the two outer side pieces are separated from the inner pieces and discarded.

6. Method according to claim 1, in which the coated tape base is cut lengthwise in the main cutting zone into two outer side pieces of waste tape and into a plurality of inner pieces of useful magnetic tape, and the two outer side pieces are separated from the inner pieces and removed under suction.

7. Method according to claim 1, in which the coated tape base is cut lengthwise into two outer side pieces of waste tape and into a plurality of inner pieces of useful magnetic tape, and the two outer side pieces are separately withdrawn and comminuted.

8. Method according to claim 1, in which the coated tape base is cut lengthwise in the main cutting zone into two outer side pieces of waste tape and into a plurality of inner pieces of useful magnetic tape; the two outer side pieces are separated from the inner pieces and discarded; and the flat faces of the pieces of magnetic tape are in spaced edge-to-edge relationship in substantially the same plane as they leave the separating zone for the winding zone.

9. Method according to claim 1, in which the pieces of magnetic tape are pulled from the main cutting zone through a gripping zone to the separating zone with their flat faces in edge-to-edge relationship in substantially the same plane.

10. Method according to claim 1, in which the pieces of magnetic tape are pulled from the main cutting zone through a gripping zone to the separating zone with their flat faces in edge-to-edge relationship in substantially the same plane as they leave the cutting zone; each piece of tape is given a partial turn to place the pieces of tape in spaced face-to-face relationship while moving from the cutting zone into the separating zone; and each piece of tape is given another partial turn to place the flat faces of the pieces of tape in spaced edge-to-edge relationship in substantially the same plane as they leave the separating zone for the winding zone.

11. Method according to claim 1, in which the coated tape base is cut lengthwise in the main cutting zone into two outer side pieces of waste tape and into a plurality of pieces of inner pieces of useful magnetic tape; all of the pieces of tape are pulled from the main cutting zone through a gripping zone to the separating zone with their flat faces in edge-to-edge relationship in substantially the same plane; and the two outer pieces of waste tape are separated from the plurality of pieces of inner magnetic tape and discarded.

12. Method according to claim 1, in which forward movement of the pieces of magnetic tape and of the coated tape base is stopped when an undesired section of the tape base reaches a splicing zone intermediate the charging and main cutting zones; the undesired section of the tape base is removed; the main ends of the tape base are spliced; and the forward movement of the pieces of magnetic tape and of the spliced tape base is resumed.

WILLIAM C. SPEED.
JAMES J. DWYER.

References Cited in the file of this patent

UNITED STATES PATENTS

| Number | Name | Date |
|---|---|---|
| 933,374 | Kienast | Sept. 7, 1909 |
| 1,259,834 | Cameron | Mar. 19, 1918 |
| 2,185,076 | Eddy | Dec. 26, 1939 |
| 2,368,152 | McWilliams | Jan. 30, 1945 |
| 2,373,500 | Pearce | Apr. 10, 1945 |
| 2,500,772 | Reed | Mar. 14, 1950 |
| 2,539,611 | Daniel et al. | Jan. 30, 1951 |